United States Patent
Nagata et al.

(10) Patent No.: US 9,777,607 B2
(45) Date of Patent: Oct. 3, 2017

(54) LUBRICATING OIL PASSAGE STRUCTURE FOR BEARING

(71) Applicant: MEIDENSHA CORPORATION, Tokyo (JP)

(72) Inventors: Koji Nagata, Tokyo (JP); Tomokazu Arigami, Tokyo (JP); Naoya Shinkawa, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 217 days.

(21) Appl. No.: 14/646,884

(22) PCT Filed: Nov. 25, 2013

(86) PCT No.: PCT/JP2013/081597
§ 371 (c)(1),
(2) Date: May 22, 2015

(87) PCT Pub. No.: WO2014/081027
PCT Pub. Date: May 30, 2014

(65) Prior Publication Data
US 2015/0275715 A1    Oct. 1, 2015

(30) Foreign Application Priority Data
Nov. 26, 2012    (JP) .................... 2012-257236

(51) Int. Cl.
*H02K 5/16*    (2006.01)
*F01M 11/02*    (2006.01)
(Continued)

(52) U.S. Cl.
CPC ......... *F01M 11/02* (2013.01); *F16C 33/1045* (2013.01); *F16C 33/6637* (2013.01);
(Continued)

(58) Field of Classification Search
CPC ........... H02K 5/15; H02K 5/1732; H02K 5/20
(Continued)

(56) References Cited

U.S. PATENT DOCUMENTS 4,262,224 A    4/1981    Kofink et al.
4,800,309 A *  1/1989    Lakin ............... H02K 5/1672
                                                        310/89
(Continued)

FOREIGN PATENT DOCUMENTS

EP    0 667 670 A1    8/1995
FR    2971821 A1      8/2012
(Continued)

OTHER PUBLICATIONS

Extended European Search Report dated Jun. 8, 2016, 7 pages.

*Primary Examiner* — Thanh Lam
(74) *Attorney, Agent, or Firm* — Foley & Lardner LLP

(57) ABSTRACT

A lubricating oil passage structure for a bearing of an oil cooled rotating machine includes a bearing (114) arranged in the center of a bracket (111) to rotatably support a rotary shaft (101). Protruding ribs (116, 117, 117a) are spirally arranged on the inner surface of the bracket (111). Also, a bearing rib (112) having an oil passage groove (113) for supplying the bearing (114) with lubricating oil is formed on the inner surface of the bracket (111). An upper projection hole (110) is formed in the upper portion of the bracket (111) for introducing the lubricating oil. The protruding ribs located on the right and left of the upper projection hole (110) in the circumferential direction are the upper protruding ribs (116) which function as guides for guiding the lubricating oil to the bearing rib. Therefore, the lubricating oil passage structure constitutes a structure that captures the lubricating oil and guides the oil to the bearing (114) without reducing the support rigidity of the bearing, while also (Continued)

constituting a rib structure capable of both improving the support rigidity of the bearing and inhibiting failure of the bearing (114).

6 Claims, 3 Drawing Sheets

(51) Int. Cl.
*F16C 33/66* (2006.01)
*H02K 5/173* (2006.01)
*F16C 35/04* (2006.01)
*F16C 33/10* (2006.01)
*H02K 9/19* (2006.01)
*F16C 37/00* (2006.01)
*H02K 5/20* (2006.01)

(52) U.S. Cl.
CPC ........ *F16C 33/6659* (2013.01); *F16C 35/042* (2013.01); *H02K 5/1732* (2013.01); *F16C 37/007* (2013.01); *H02K 5/20* (2013.01); *H02K 9/19* (2013.01)

(58) Field of Classification Search
USPC .............................. 310/54, 90, 400–402, 425
See application file for complete search history.

(56) References Cited

U.S. PATENT DOCUMENTS

| 8,508,090 B2 | 8/2013 | Tanaka et al. |
| 2012/0062055 A1* | 3/2012 | Murakami ............... H02K 9/19 310/54 |
| 2012/0299419 A1 | 11/2012 | Tanaka et al. |

FOREIGN PATENT DOCUMENTS

| JP | 62-46857 U | 3/1987 |
| JP | 5-89958 U | 12/1993 |
| JP | 2001-32914 A | 2/2001 |
| JP | 5136688 B2 | 2/2013 |
| WO | WO 2011/101911 A1 | 8/2011 |

\* cited by examiner

LUBRICATING OIL PASSAGE STRUCTURE FOR BEARING

TECHNICAL FIELD

The present invention relates to a lubricating oil passage structure for a bearing. Specifically, the present invention relates to a rib structure in which ribs provided to enhance bearing support rigidity also have an oil guide function in an oil passage structure for a bearing of an oil cooled rotating machine, and in particular to a rib structure also having a function capable of guiding oil to the bearing.

BACKGROUND ART

In Patent Document 1, as illustrated in FIG. 3, ribs 36b, 36c formed on an inner wall of an exterior case 3a of an electric motor 5 constitute an oil guide for picking up and guiding oil, and openings 37a, 37b are formed in a ring-shaped flange portion 29. Thus, the ribs 36b, 36c function as the oil guide, and the oil guided by the ribs 36b, 36c are introduced into a space portion C from the openings 37a, 37b (paragraph 0029).

In addition, in Patent Document 1, as illustrated in FIG. 4, a boss 41 for a bearing 22 which supports a shaft 20 is formed, and an upper portion of the boss 41 is partly cut out to form an opening 41a for introducing the oil. An inside of the boss 41 forms an oil pool D in collaboration with an end surface of the shaft 20. The oil pool is formed to be relatively small for the purpose of introducing the oil quickly to a lubricating hole 43 formed in the shaft 20. At a lower portion of the oil pool, the wall of the case comes close to the inner race of the bearing so as to prevent the oil from escaping from the bearing 22 (paragraph 0031). This structure can introduce the oil the oil pool D by causing the oil to fall onto two ribs 46 formed in a radially-outer portion of an inner case 3b, and then dropping the oil to introducing ribs 42 (paragraph 0032).

PRIOR ART DOCUMENT

Patent Document

Patent Document 1: Japanese Patent Application Publication No. 2001-032914

SUMMARY OF THE INVENTION

Problems to be Solved by the Invention

The conventional technique described in Patent Document 1 is intended to introduce the oil to the space C and to quickly introduce the oil to the lubricating hole 43 formed in the shaft 20.

For this reason, the above technique does not consider active guiding of the lubricating oil to the bearing in a bearing area. Thus, a load side does not have a structure which guides the oil to the bearing area, which may cause a deficiency of oil supply to the bearing.

Also on an opposite side to the load side, the oil level h of the oil pool D is low because the oil is introduced quickly to the lubricating hole 43, and therefore the oil supply to the bearing is not sufficient.

In addition, the opposite side to the load side has a structure which somewhat guides the oil to the bearing area by using the ribs, but indeed guides the oil limitedly to the oil pool D where the shaft 20 does not exist.

Moreover, although the oil guiding ribs 46 are provided, the strength of the bearing area has a problem of a reduction in bearing strength due to the presence of the opening 41a.

For these reasons, the structure is insufficient in terms of oil supply, and therefore has a problem of the occurrence of failure (seizure, abrasion increase, or the like) of the bearing or a bearing strength problem.

Means for Solving the Problems

A lubricating oil passage structure for a bearing according to a first aspect of the present invention for solving the foregoing problem includes: a rotor including a rotary shaft; a stator arranged at an outer circumferential side of the rotor with a gap interposed in between; a frame to which the stator is fixed; a bracket joined to an end of the frame; and a bearing arranged at a center of the bracket and rotatably supporting the rotary shaft, in which an inner surface of the bracket is provided with protruding ribs arranged radially and a bearing rib formed including an oil passage groove to supply lubricating oil to the bearing, an upper portion of the bracket is provided with an upper projection hole to introduce the lubricating oil, and the protruding ribs located at right and left sides of the upper projection hole in a circumferential direction are upper protruding ribs which function as a guide to guide the lubricating oil to the bearing rib.

In a lubricating oil passage structure for a bearing according to a second aspect of the present invention for solving the foregoing problem, the upper protruding ribs are terminated at middle positions in a radial direction toward the rotary shaft, and have a shorter length than the other protruding ribs in the structure of the first aspect.

In a lubricating oil passage structure for a bearing according to a third aspect of the present invention for solving the foregoing problem, the protruding ribs adjacent to sides of the upper protruding ribs opposite to the upper projection hole serve as a guide to guide the lubricating oil to the bearing rib, and are contiguous to the bearing rib in the structure of the second aspect.

In a lubricating oil passage structure for a bearing according to a fourth aspect of the present invention for solving the foregoing problem, the bearing is buried and fixed in the bracket and the bearing rib in the structure of the third aspect.

Effect of the Invention

Some of ribs are provided with an oil guiding function, which makes it possible to guide lubricating oil to a bearing efficiently.

MODE FOR CARRYING OUT THE INVENTION

Figure 1:
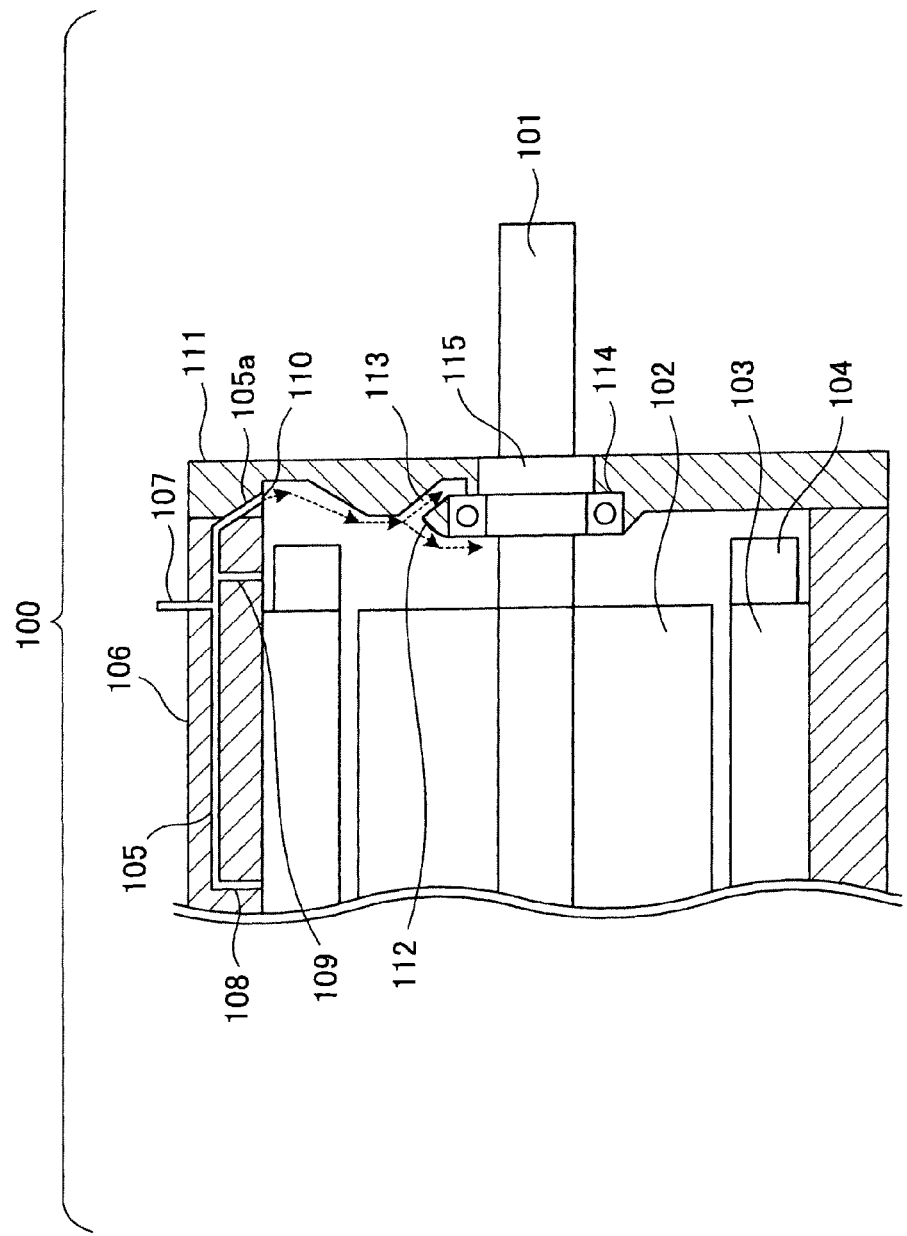
FIG. 1 is a side cross sectional view of an oil cooled rotating machine according to a first embodiment of the present invention.

Hereinafter, the present invention is described in details with reference to embodiments illustrated in the drawings.

Embodiment 1

FIG. 1 illustrates a schematic structure of an oil cooled rotating machine according to a first embodiment of the present invention.

An oil cooled rotating machine 100 includes a rotary shaft 101 which transmits torque to a load, and a rotor 102 fixed to an outer circumferential side of the rotary shaft 101.

In addition, the oil cooled rotating machine 100 includes a stator 103 having a wining and provided on an outer circumferential side of the rotor 102 with a space (gap between the rotor and the stator) interposed in between, and a coil end 104 provided at an end of the stator 103 in an axial direction.

Moreover, a frame 106 in which an oil passage 105 is formed is fixed to an outer circumferential portion of the stator 103.

Brackets 111 are fixed to both end surfaces of the frame 106. A bearing 114 and an oil seal 115 are arranged at the center of each of the brackets 111. The bearing 114 rotatably supports the rotary shaft 101.

The oil passage 105 formed in the frame 106 includes an inlet hole 107 for taking in oil from outside of the oil cooled rotating machine 100, a stator projection hole 108 for cooling the stator, a coil end projection hole 109 for cooling the coil end 104, and an upper projection hole 110 for supplying the oil for lubricating the bearing 114.

In FIG. 1, the inlet hole 107 is provided in an upper outer-circumferential portion of the frame 106 in a radial direction, but the position of the inlet hole 107 is not limited to this. Besides the structure where the oil is supplied from the outside of the rotating machine 100, another possible example is a structure which picks up the oil stored in an oil bath and circulates the oil, for example.

In addition, the stator projection hole 108 is provided a position on a radially-inner side of the frame facing the stator 103 in FIG. 1, but the position of the stator projection hole 108 is not limited to this. Instead, an oil passage 105 continuously extending from the frame 106 and passing through the stator 103 may be formed by providing a through hole inside the stator.

Moreover, the coil end projection hole 109 is provided at a position on the radially-inner side of the frame facing the coil end 104 in FIG. 1, but the position of the coil end projection hole 109 is not limited to this, either. All the projection holes are described herein just as one example of the embodiment.

The upper projection hole 110 is provided in an upper portion of the bracket 111 in such a manner as to extend from the oil passage 105 formed in the frame 106, communicate with an oil passage 105a formed in the bracket 111, and face in a radially-inward direction (toward the rotary shaft). Here, as is the case with the other projection holes, the upper projection hole 110 is not limited to the structure illustrated in FIG. 1.

Figure 2:
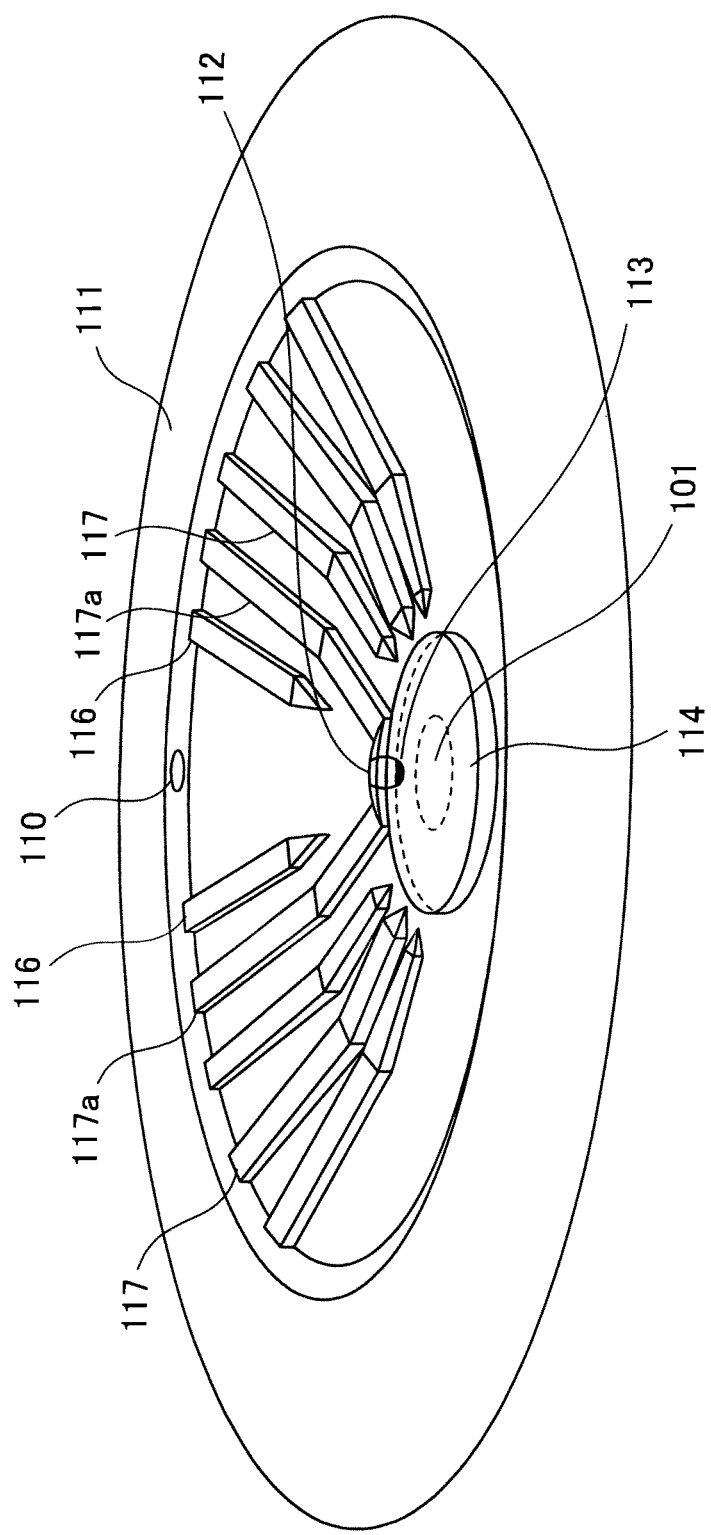
FIG. 2 is a perspective view of a bracket in the oil cooled rotating machine according to the first embodiment of the present invention.
Figure 3:
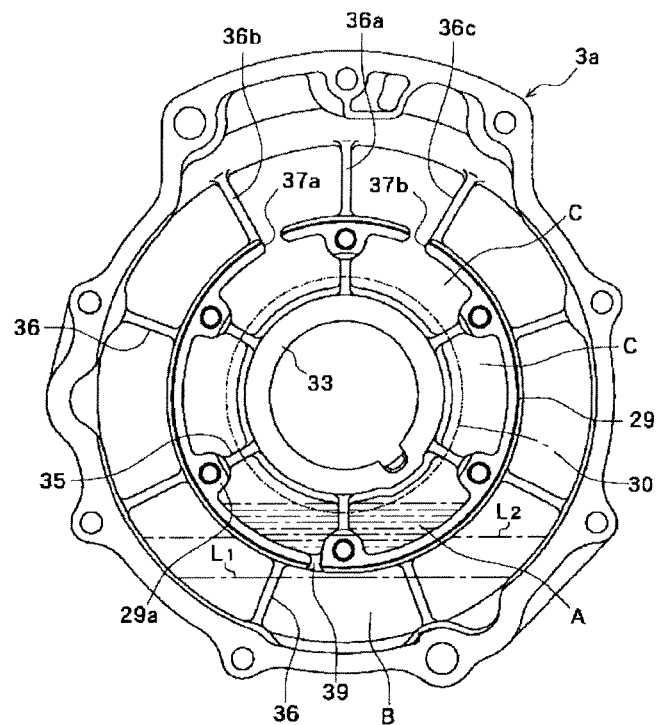
FIG. 3 is a side surface view of one of cases of a drive unit described in Patent Document 1.
Figure 4:
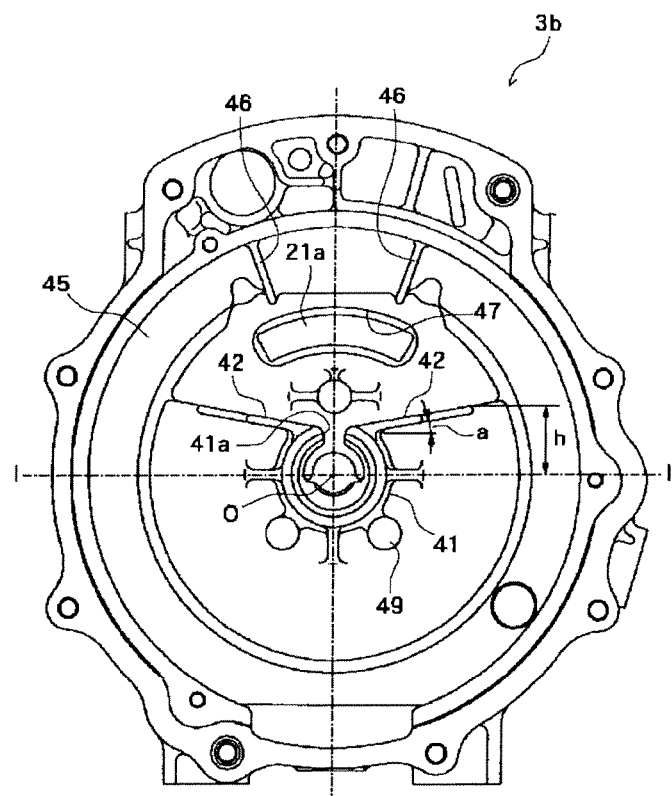
FIG. 4 is a side surface view of the other case of the drive unit described in Patent Document 1.

As illustrated in FIG. 2, multiple ribs 116, 117a, 117 are arranged radially on an inner surface of the bracket 111. Note that FIG. 2 illustrates the multiple ribs 116, 117a, 117 in a simplified manner.

FIG. 2 is a perspective view of a contact surface of the bracket 111 with the frame 106 in FIG. 1 viewed from a lower side (a view in which the bracket 111 is obliquely seen from the lower side).

The upper projection hole 110 is a through hole extending in an oblique direction with its axial end located on a radially-inner side of the bracket 111 (in a direction from the upper left side toward the lower right side in the case of FIG. 1).

The upper protruding ribs 116 are ribs provided near the upper projection hole 110 at right and left positions in the circumferential direction. The upper protruding ribs 116 each have a shape in which the rib is terminated at a middle position of the bracket 111 in the radially-inward direction (in a direction toward the rotary shaft), and accordingly have a rib length shorter than the other protruding ribs 117 (hereinafter, simply referred to as the "protruding ribs 117").

The protruding ribs 117 are ribs arranged radially on the opposite side of the upper protruding ribs 116 from the upper projection hole 110, and extending to a position close to the bearing 114 located on the radially-inner side (on the rotary shaft side).

Meanwhile, only protruding ribs (adjacent) 117a located adjacent to the sides of the upper protruding ribs 116 opposite to the upper projection hole 110 are contiguous to a bearing rib 112.

A radially-inner side of the bearing rib 112 faces and is in contact with a radially-outer side of the bearing 114, and a radially-outer side of the bearing rib 112 faces the upper projection hole 110.

Here, these ribs provided to the bracket 111 only have to be protruding, and their shapes are not limited at all in particular.

In addition, a bracket 111 inner surface of the bearing rib 112 has a structure grooved to form an oil passage groove 113.

An outer circumference of the bearing 114 is buried in and fixed to the bracket 111 and the bearing rib 112 in order to ensure bearing rigidity. The bearing 114 has no openings in the outer circumference thereof, and such a structure does not cause a reduction in the bearing strength.

Then, at an oil seal 115 side of the bearing 114, the bracket 111 is provided with an oil passage in which the oil passage groove 113 is engraved.

The oil cooled rotating machine having the foregoing structure according to the present embodiment produces the following operations and effects.

Specifically, as illustrated by dotted line arrows in FIG. 1, the lubricating oil entering from the inlet hole 107 is supplied through the oil passage 105 from the stator projection hole 108 to the stator 103, and from the coil end projection hole 109 to the coil end 104, and from the upper projection hole 110 to the bearing 114.

Here, the protruding ribs 117 are provided in order to enhance the bracket rigidity and shaft support rigidity, and the upper protruding ribs 116 are also provided which have both a function to enhance the rigidity, and a function to capture and concentrate the oil discharged from the upper projection hole 110, and to guide the oil to the bearing 114.

To this end, in order to efficiently guide the captured oil to the bearing rib 112, the upper protruding ribs 116 are configured to have a shorter rib length in the radial direction than the other protruding ribs 117.

Moreover, the protruding ribs (adjacent) 117a adjacent to the sides of the upper protruding ribs 116 opposite to the upper projection hole 110 are contiguous to the bearing rib 112 as described above, and thereby are configured to guide the lubricating oil, captured and guided by the upper protruding ribs 116, to the bearing rib 112.

In addition, the lubricating oil captured and guided by the protruding ribs (adjacent) 117a and the upper protruding ribs 116 can be supplied between the bearing 114 and the oil seal 115 through the oil passage groove 113 engraved in the inner surface of the bracket 111, while the rest of the lubricating oil branched off from the lubricating oil supplied to the bearing 114 via the oil passage groove 113 is dropped to and flows over a bracket-opposed surface of the bearing 114 on the opposite side to the oil seal 115. Thus, the lubricating oil can lubricate all over the bearing 114.

In this way, the structure of the ribs for enhancing the rigidity is provided with the upper protruding ribs 116 having a shorter length, the protruding ribs (adjacent) 117a adjacent to the upper protruding ribs 116, and the bearing rib 112, and further is provided with the oil passage groove 113 on the bracket surface of the bearing rib 112. This structure is capable of efficiently supplying the lubricating oil to the bearing 114, and enables avoidance of failure (seizure or abrasion increase, or the like) of the bearing 114.

Moreover, the lubricating oil flowing out from the coil end projection hole 109 flows to the rotor 102, is scattered with rotation of the rotor 102, and thereafter is guided by the upper protruding ribs 116 and the protruding ribs (adjacent) 117a.

A major part of the lubricating oil flowing out of the upper projection hole 110 of the bracket 111 flows over the surface of the bracket 111, and the lubricating oil adhered to the inner surface of the upper portion of the bracket is guided to the bearing 114 by means of the structure including the upper protruding ribs 116, the protruding ribs (adjacent) 117a, and the bearing rib 112. The presence of these ribs may prevent a reduction of the lubricating oil flowing to the bearing 114. If the ribs are not present, a larger amount of lubricating oil is dropped to the lower side of the rotating machine without being guided to the bearing 114.

In the illustrated structure, the protruding ribs (adjacent) 117a are adjacent to the upper protruding ribs 116, but such adjacency is not essential.

Moreover, although two upper protruding ribs 116 are illustrated above, the number of upper protruding ribs 116 is not limited to two. It is only necessary that any number of ribs having a short length be provided on an upper projection hole 110 side of the protruding ribs 117.

Furthermore, in the description provided in the foregoing embodiment, only some of the protruding ribs 117 are illustrated in the simplified manner. From the viewpoint of the rigidity of the bracket 111, it is preferable that the ribs be arranged radially in the circumferential direction. The number of ribs, a rib width, and a rib pitch may be determined as needed according to the design.

As described specifically based on the embodiment hereinabove, the oil cooled rotating machine of the present embodiment employs a rib structure also having a function to guide lubricating oil to a bearing without reducing the bracket rigidity, and thereby is configured to capture and guide the lubricating oil to the bearing without reducing the bearing support rigidity. Thus, the rib structure is made capable of both improving the bearing support rigidity and inhibiting failure of the bearing.

INDUSTRIAL APPLICABILITY

A lubricating oil passage structure for a bearing of the present invention is usable in a wide range of industrial applications as a rib structure in which ribs for enhancing the bearing support rigidity have an oil guide function in an oil passage structure of a bearing portion of an oil cooled rotating machine.

EXPLANATION OF THE REFERENCE NUMERALS 110 upper projection hole
111 bracket
112 bearing rib
113 oil passage groove
116 upper protruding rib
117 protruding rib
117a protruding ribs (adjacent)

The invention claimed is:

1. A lubricating oil passage structure for a bearing, comprising:
    a rotor including a rotary shaft;
    a stator arranged at an outer circumferential side of the rotor with a gap interposed in between;
    a frame to which the stator is fixed;
    a bracket joined to an end of the frame; and
    a bearing arranged at a center of the bracket and rotatably supporting the rotary shaft,
    wherein an inner surface of the bracket is provided with protruding ribs arranged radially and a bearing rib formed including an oil passage groove to supply lubricating oil to the bearing, an upper portion of the bracket is provided with an upper projection hole to introduce the lubricating oil, and protruding ribs located at right and left sides of the upper projection hole in a circumferential direction are upper protruding ribs which guide the lubricating oil to the bearing rib, and
    wherein the bearing is buried in and fixed to the bracket and the bearing rib.

2. The lubricating oil passage structure for a bearing according to claim 1, wherein the upper protruding ribs are terminated at middle positions in a radial direction toward the rotary shaft, and have a shorter length than the other protruding ribs.

3. The lubricating oil passage structure for a bearing according to claim 2, wherein protruding ribs adjacent to sides of the upper protruding ribs opposite to the upper projection hole guide the lubricating oil to the bearing rib, and are contiguous to the bearing rib.

4. The lubricating oil passage structure for a bearing according to claim 3, wherein the bearing has no opening in an outer circumference thereof.

5. The lubricating oil passage structure for a bearing according to claim 3, wherein the upper protruding ribs and the protruding ribs adjacent to sides of the upper protruding ribs are structured to supply lubricating oil between the bearing and an oil seal through the oil passage groove.

6. The lubricating oil passage structure for a bearing according to claim 5, wherein the bearing includes a surface opposed to the bracket, and lubricating oil is directed to flow over the surface opposed to the bracket on an opposite side to the oil seal.

* * * * *